(12) United States Patent
Kjellnes et al.

(10) Patent No.: US 10,612,593 B2
(45) Date of Patent: Apr. 7, 2020

(54) MAGNETIC PRELOADING OF BEARINGS IN ROTATING MACHINES

(71) Applicant: OneSubsea IP UK Limited, London (GB)

(72) Inventors: Hans Fredrik Kjellnes, Bergen (NO); Erik A. Torbergsen, Bergen (NO); Åsmund Valland, Bergen (NO); Audun Magne Askeland, Bergen (NO)

(73) Assignee: ONESUBSEA IP UK LIMITED, London (GB)

( * ) Notice: Subject to any disclaimer, the term of this patent is extended or adjusted under 35 U.S.C. 154(b) by 0 days.

(21) Appl. No.: 15/795,522

(22) Filed: Oct. 27, 2017

(65) Prior Publication Data

US 2018/0119737 A1 May 3, 2018

(30) Foreign Application Priority Data

Oct. 31, 2016 (GB) .................................. 1618362.6

(51) Int. Cl.
*F16C 17/03* (2006.01)
*F16C 32/06* (2006.01)
*F16C 25/04* (2006.01)
*F16C 39/06* (2006.01)

(52) U.S. Cl.
CPC ............ *F16C 32/064* (2013.01); *F16C 17/03* (2013.01); *F16C 25/045* (2013.01); *F16C 39/063* (2013.01); *F16C 2326/00* (2013.01); *F16C 2380/26* (2013.01)

(58) Field of Classification Search
CPC .. F16C 32/041; F16C 32/0412; F16C 24/045; F16C 39/063; F16C 17/028; F16C 17/03; F16C 17/035; F16C 2326/00; F16C 2380/26; F16C 32/064

See application file for complete search history.

(56) References Cited

U.S. PATENT DOCUMENTS

| 5,220,232 A * | 6/1993 | Rigney, II ........... F16C 32/0438 310/156.25 |
| 6,071,014 A | 6/2000 | Lee et al. |
| 2011/0044831 A1* | 2/2011 | Cunningham .......... F04D 1/063 417/410.1 |

(Continued)

FOREIGN PATENT DOCUMENTS

| EP | 0266991 A2 | 11/1987 |
| EP | 1524559 A2 | 4/2005 |

(Continued)

OTHER PUBLICATIONS

Machine Translation of WO 1995-020260 (Year: 1995).*

(Continued)

*Primary Examiner* — Alan B Waits
(74) *Attorney, Agent, or Firm* — Fletcher Yoder, P.C.

(57) ABSTRACT

In rotating machine having a vertically oriented rotating shaft, a static magnetic force is used to simulate rotor weight and create the desired bearing preload. By installing a magnet the gravity based preload on the shaft journal bearings of a horizontal machine can be simulated for a vertical shaft. This can increase rotor stability, reduce the machine's vulnerability to hydraulically induced imbalance forces and give a more smooth transition through various shaft speeds.

11 Claims, 6 Drawing Sheets

(56) References Cited

U.S. PATENT DOCUMENTS

| | | | |
|---|---|---|---|
| 2011/0101808 A1* | 5/2011 | Kuwata | F16C 32/0459 310/90.5 |
| 2013/0028731 A1* | 1/2013 | Mimura | F16C 17/03 415/229 |
| 2013/0216351 A1* | 8/2013 | Griffin | F01D 25/06 415/1 |
| 2014/0246937 A1* | 9/2014 | Post | F16C 32/0408 310/90.5 |
| 2015/0048725 A1* | 2/2015 | Bittner | F16C 32/0444 310/68 D |
| 2015/0229182 A1 | 8/2015 | Lang | |
| 2015/0233421 A1* | 8/2015 | Bott | F16C 32/0468 310/90.5 |
| 2016/0084304 A1* | 3/2016 | Maier | F16C 32/047 310/90.5 |

FOREIGN PATENT DOCUMENTS

| | | |
|---|---|---|
| GB | 1524662 A | 9/1978 |
| WO | 9520260 A1 | 7/1995 |
| WO | 2009137316 A1 | 11/2009 |
| WO | 2015047086 A1 | 4/2015 |

OTHER PUBLICATIONS

Extended European Search Report issued in European Patent Appl. No. 17199324.9 dated Apr. 13, 2018; 7 pages.
Eisenmann, Sr., et al.,"Tilt Pad Bearing Preload", Sulzer Tech. Rev., 2004, pp. 4-6.
Search Report issued in Great Britain Patent Appl. No. GB1618362.6 dated Apr. 20, 2017; 4 pages.

* cited by examiner

MAGNETIC PRELOADING OF BEARINGS IN ROTATING MACHINES

TECHNICAL FIELD

The present disclosure relates to bearings used in rotating machines. More particularly, the present disclosure relates to using magnetic field for preloading of a vertically oriented rotating shaft such as found in rotating machines configured for subsea deployment.

BACKGROUND

Fluid-film journal bearings provide the primary lateral support for horizontal and vertical turbomachinery rotors. Bearing design is dependent upon criteria such as load, speed, stability, rotor dynamics, lubricants and cost. Within the array of design parameters, preload is significant in controlling bearing performance, which ultimately impacts maintenance and operating costs. Bearing preload is often used to adjust bearing coefficients in order to obtain specific rotor response. *Tilt Pad Bearing Preload*, Robert C. Eisenmann Sr., Sulzer Tech. Rev. (2004) discusses aspects of tilt-pad bearing design and preload where the shaft is oriented horizontally. When the shaft is oriented horizontally, the weight of the shaft assembly, or rotor, provides a well-defined downward force, which pulls the shaft towards the bottom of the bearing clearance. This displacement gives a defined preload as described by the equation:

$$\text{Preload} = 1 - \frac{C_{brg}}{C_{pad}}.$$

The dynamic response from the bearings can be assumed to be linear, which leads to predictable dynamic behavior in horizontally oriented rotating machines. However, in rotating machines where the shaft is oriented vertically, the weight of the shaft/rotor assembly does not provide significant bearing preload force. The bearings are only lightly loaded and there is no defined direction of the static load. Dynamic responses to fluid interacting with the pump components may include large undesirable amplitudes and/or be non-linear, unstable and difficult to predict.

SUMMARY

This summary is provided to introduce a selection of concepts that are further described below in the detailed description. This summary is not intended to identify key or essential features of the claimed subject matter, nor is it intended to be used as an aid in determining or limiting the scope of the claimed subject matter as set forth in the claims.

According to some embodiments, a rotating machine is described that includes: an elongated rotating shaft having a primary vertically oriented axis of rotation and a journal; a hydrodynamic bearing surface shaped and positioned to engage the journal such that a viscous fluid is pulled between the bearing surface and the journal by the rotating of the shaft during machine operation thereby providing lubrication; and a magnet configured to impart a lateral force on the shaft thereby pulling the first journal towards the first bearing surface. According to some embodiments, the lateral force is static, for example where the magnet is a permanent magnet. The bearing surface can be configured to tilt by pivoting on a fulcrum. A number of other tilting bearing surfaces can also be provided bearing surfaces each configured to pivot on a respective fulcrum.

According to some embodiments, the elongated shaft also includes a second journal. In such cases a second hydrodynamic bearing surface can be configured to engage the second journal, and a second magnet can be configured to impart a lateral force on the shaft thereby pulling the second journal towards the second bearing surface.

According to some embodiments, the machine is configured for deployment in a subsea location, and in some examples the machine can be a subsea single phase pump, a subsea multiphase pump, a subsea compressor, or a subsea separator.

According to some embodiments, a method of operating a rotating machine is described that includes: rotating an elongated shaft about a vertically oriented primary axis; and imparting a static lateral force on the shaft using a magnet such that a first journal on the rotating shaft is pulled towards a first bearing surface.

BRIEF DESCRIPTION OF THE DRAWINGS

The subject disclosure is further described in the following detailed description, and the accompanying drawings and schematics of non-limiting embodiments of the subject disclosure. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

One or more specific embodiments of the present disclosure will be described below. The particulars shown herein are by way of example, and for purposes of illustrative discussion of the embodiments of the subject disclosure only, and are presented in the cause of providing what is believed to be the most useful and readily understood description of the principles and conceptual aspects of the subject disclosure. In this regard, no attempt is made to show structural details of the subject disclosure in more detail than is necessary for the fundamental understanding of the subject disclosure, the description taken with the drawings making apparent to those skilled in the art how the several forms of the subject disclosure may be embodied in practice. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are used in an open-ended fashion, and thus should be interpreted to mean "including, but not limited to." Also, any use of any form of the terms "connect," "engage," "couple," "attach," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," and variations of these terms is made for convenience, but does not require any particular orientation of the components.

Certain terms are used throughout the description and claims to refer to particular features or components. As one skilled in the art will appreciate, different persons may refer to the same feature or component by different names. This document does not intend to distinguish between components or features that differ in name, but not function.

As used herein the terms "vertical" and "vertically" refer to something be being vertical or nearly vertical. Likewise, the terms "lateral" or "laterally" refer to something be being horizontal or nearly horizontal. As used therein the phrases "hydrodynamic bearing" and "fluid dynamic bearing" refer to bearings that rely on the speed of the journal, the part of the shaft or rotor that is resting on the lubricating fluid, to suck the fluid on to the surfaces of the bearing, forming a lubricating wedge under or around the journal.

FIGS. 1A-D are diagrams illustrating shaft positions that can occur in vertically oriented rotating machines. As discussed, supra, in vertically oriented rotating machines dynamic responses to fluid interactions with the impellers and other pump structures can be undesirably large and/or be unpredictable due to the lack of a significant bearing preload force on the vertically oriented shaft. FIGS. 1A-D show a cross section of a rotating machine where shaft 110 is oriented vertically. In this case there are five tilt-pad journal bearings 120, 122, 124, 126 and 128 that are configured to pivot on fulcrums (or pivot points) 130, 132, 134, 136 and 138, respectively. As a result of the vertical orientation, the bearings 120, 122, 124, 126 and 128 are only lightly loaded and there is no defined direction of the static load. The resulting response may be non-linear with dynamic responses that may be unstable and being difficult to predict. In FIGS. 1A, 1B, 1C and 1D, various different locations of the shaft 110 are illustrated relative to the bearings 120, 122, 124, 126 and 128. Rather than oscillate between such positions in a predictable fashion, a vertically oriented shaft may move between various positions in an unpredictable fashion due to a lack of a significant bearing preload force. Note that in FIGS. 1B and 1C the tilt pad bearings are shown slightly displaced, due to the load of the shaft. The original positions of the tilt pad bearings are illustrated in dashed outline.

The lack of static load in a vertical machine also reduces the initial stiffness and damping coefficients in the bearing, and may make such machines more unstable and prone to low energy/high amplitude non-synchronous vibrations. This can easily cause such machines to fall outside the required design criteria of applicable design standards such as API 610 and API 617, without necessarily being harmful to the machine.

According to some embodiments, to address this challenge for a vertically assembled turbomachinery rotor, a static magnetic force is used to simulate rotor weight and create the desired bearing preload. By installing a magnet in the axial proximity of the shaft journal bearings the gravity based preload of a horizontal machine can be "replicated" for a vertical shaft. This can increase rotor stability, reduce the machine's vulnerability to hydraulically induced imbalance forces and give a more smooth transition through critical shaft speeds.

Figure 1A:
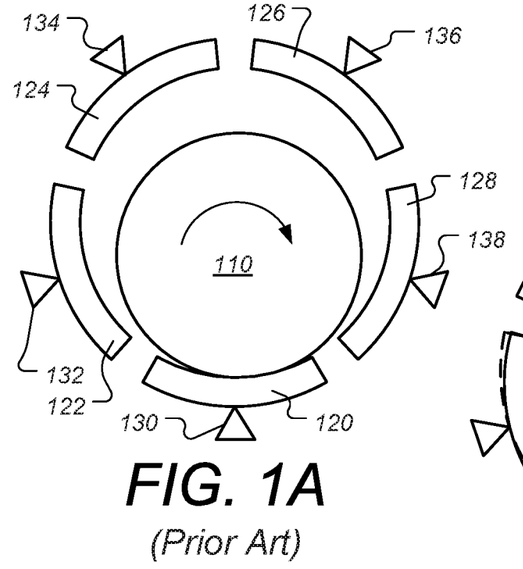
FIGS. 1A-D are diagrams illustrating various shaft positions that can occur in vertically oriented rotating machines.
Figure 1B:
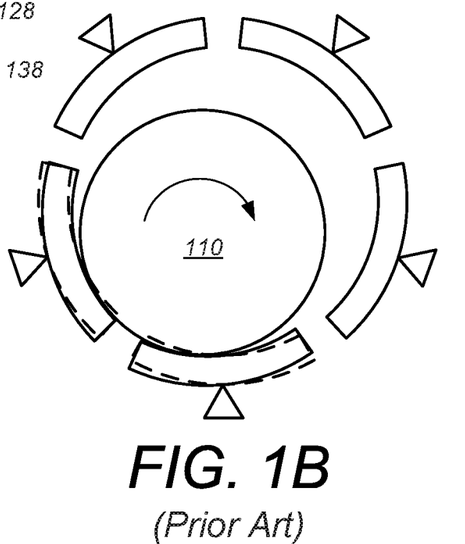
Figure 1C:
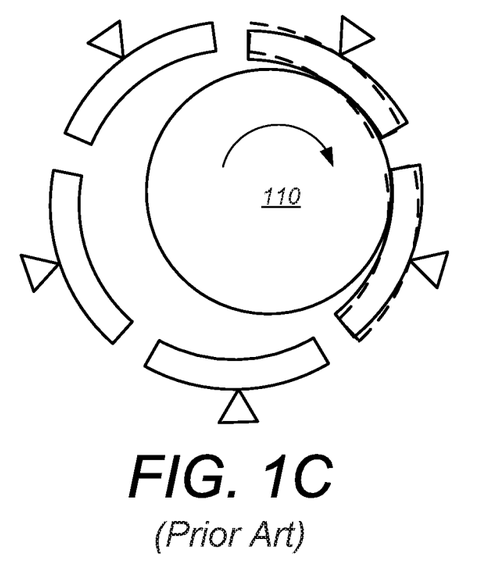
Figure 1D:
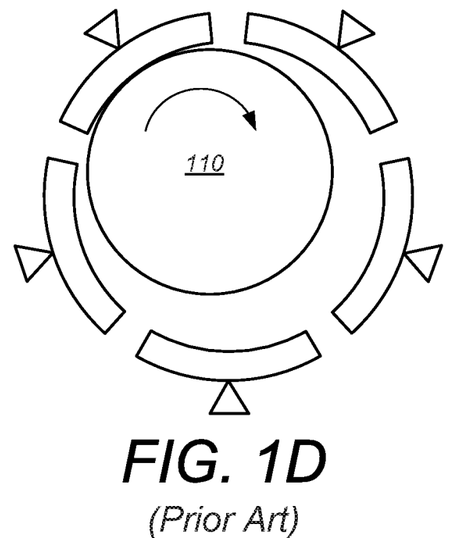
Figure 2:
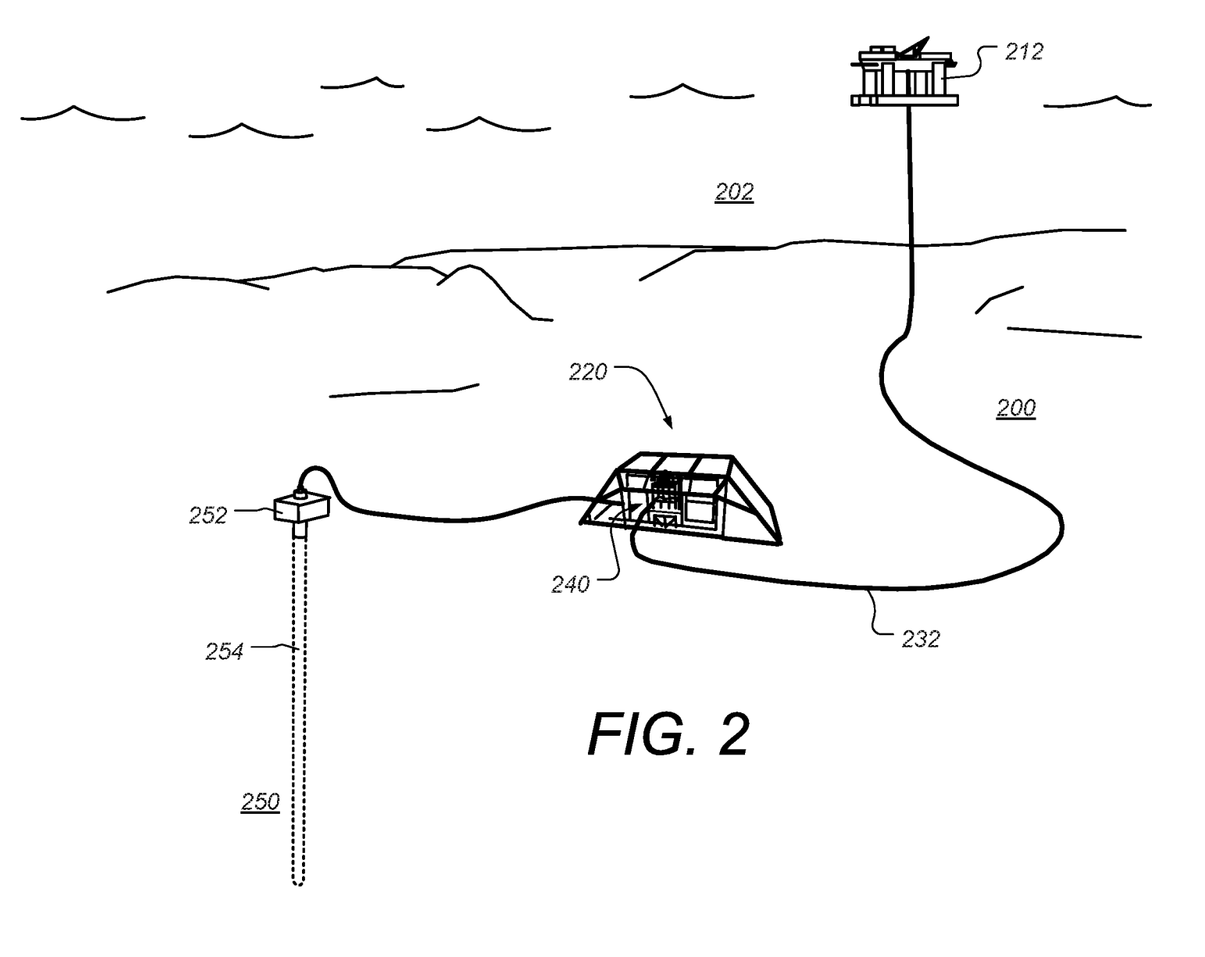
FIG. 2 is a diagram illustrating a subsea environment in which a rotating machine having a magnetically preloaded shaft bearing might be deployed, according to some embodiments.

FIG. 2 is a diagram illustrating a subsea environment in which a rotating machine having a magnetically preloaded shaft bearing might be deployed, according to some embodiments. On sea floor 200 a subsea station 220 is shown which is near wellhead 252 for well 254. Well 254 is being used in the recovery of hydrocarbons from a subterranean formation 250. For example the well 254 might be used for production of the hydrocarbons or it might be used for injection that stimulates hydrocarbon production. Station 220 includes a subsea water pumping system 240, which is powered by one or more electric motors. The station 220 is connected to an umbilical cable, such as umbilical 232, which supplies power to the electric motor(s) in station 220. The umbilical in this case is being run from a platform 212 through seawater 202, along sea floor 200 to station 220. In other cases, the umbilicals may be run from some other surface facility such as a floating production, storage and offloading unit (FPSO), or a shore-based facility. According to some embodiments, umbilical 232 is also used to supply barrier fluid to station 220. The umbilical 232 can also be used to supply other fluids to station 220, as well as include control and data lines for use with the subsea equipment in station 220. Although not shown for simplicity, other equipment such as other wells, other subsea stations, other umbilicals, and flowlines may be present as well. Although a pumping system 240 is shown in the example of FIG. 2, according to other embodiments, the system 240 can be configured for other types of tasks. For example, other types of fluid processing systems that could benefit from the techniques described herein are subsea compressors for gas and wet gas, and subsea separators. In general any type of rotating machinery having a vertically oriented shaft and journal radial bearings can use the magnetically induced preloading techniques described herein.

Figure 3:
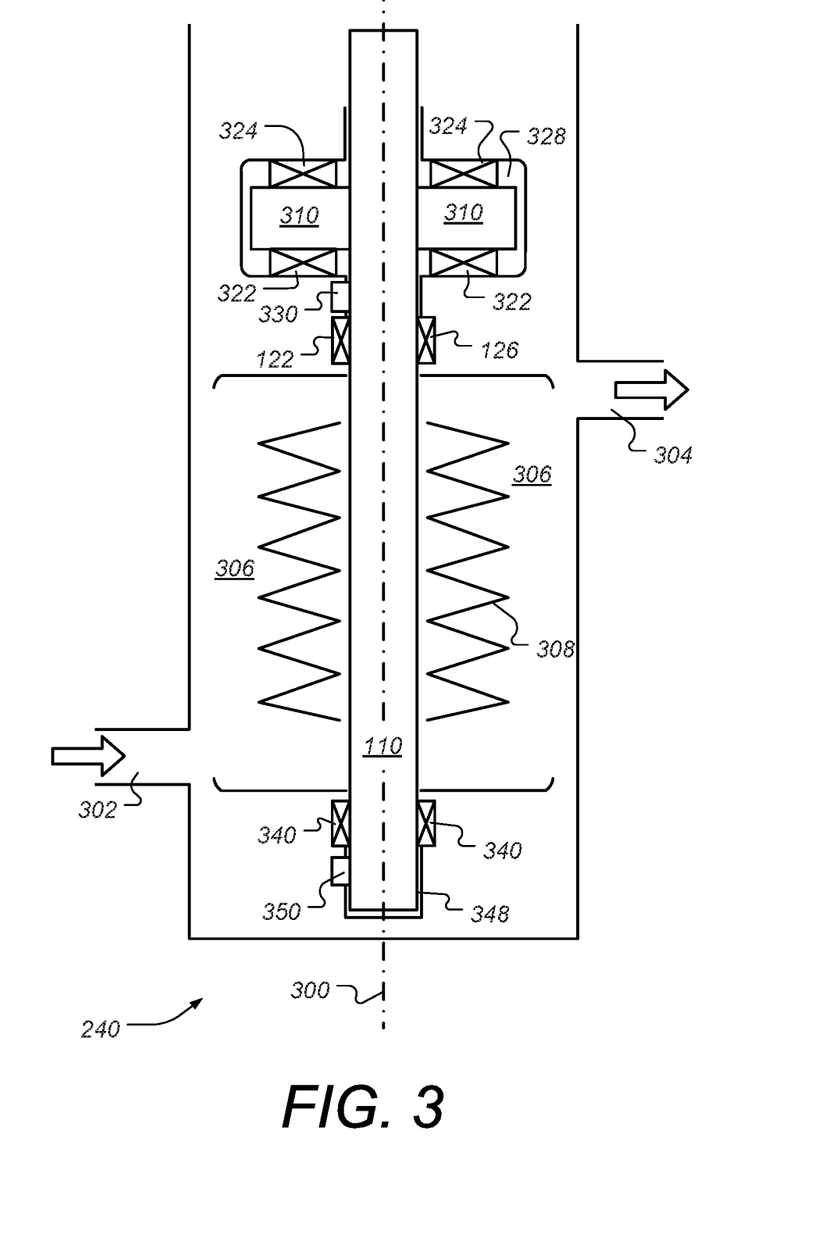
FIG. 3 is a diagram showing aspects of a vertically oriented pump having magnetically preloaded shaft bearings, according to some embodiments.

FIG. 3 is a diagram showing aspects of a vertically oriented pump having magnetically preloaded shaft bearings, according to some embodiments. In pumping station 240 has an inlet 302 through which the process fluid is drawn. The process fluid is drawn through a series of impeller stages 308 within pump chamber 306 and expelled through outlet 304. The impellers are fixedly mounted to shaft 110 that rotates about central longitudinal axis 300. As the fluid is moved upwards though pump chamber 306 by the impeller stages 308, a downwards counteracting force is generated on the impellers 308 and shaft 110. A large thrust disk 310 and main thrust bearing 322 are used to handle the downwards force on shaft 110. Reverse thrust bearing pads 324 may also be supplied to maintain vertical positioning and handle upwards thrust, which may be experienced for example in a "turbine" or "wind milling" condition where process fluid is allowed to flow through the pump while the motor is not being powered. The horizontal, or radial positioning of the shaft 110 is maintained using two sets of journal bearings. According to some embodiments, tilt-pad bearings such as shown in FIGS. 1A-D and 4A-B can be used, and as such upper tilt-pad journal bearings 122 and 126 are shown. A set of lower journal bearings 340 are located below the pump chamber. Note that journal bearings 340 may also be a tilt-pad type bearing as shown in FIGS. 1A-D and 4A-B. Two permanent magnets 330 and 350 are shown which provide a lateral preload force on the shaft 110. According to some embodiments, the permanent magnets 330 and 350 are configured to attract the shaft 110 and so provide a preload force towards the magnets 330 and 350. By positioning permanent magnets 330 and 350 with a small gap towards shaft 110, which is machined out of magnetic material, the entire shaft 110 is pulled to one side (left in FIG. 3) of the bearing clearance and bearing preload of desired magnitude can be obtained. In selecting the size, position and material of magnets 330 and 350, a preload magnitude that simulates the weight of the shaft assembly (including shaft 110, impellers 308 and thrust disk 310) can be obtained. However, other amounts of preload force can also be used depending on the particular application. In order to reduce bending moments induced on shaft 110 in some cases it may be desirable to position the magnets 330 and 350 in close proximity to journal bearings 122 and 340 respectively. Also visible in FIG. 3 are volumes 328 and 348 that can be configured to contain barrier fluid for use on the bearing surfaces. According to some embodiments, a mountain bracket arrangement may be used for magnets 330 and 350 such as shown and described with respect to FIG. 6.

Although the example of FIG. 3 shows two sets of radial bearing and two permanent magnets, other numbers of bearing and other numbers of magnets can be used. For example, according to some embodiments, each set of radial bearings may have two permanent magnets associated with it. In such cases the can be one magnet above and the other below each radial journal bearing. According to some embodiments, the magnets 330 and 350 are electromagnets instead of permanent magnets and references in this description to permanent magnets are understood to also include electromagnets as well as a combination of permanent and electromagnets. Using electromagnets instead of or in addition to permanent magnets may allow for regulation of the preload force and could provide further control over the shaft modes under some circumstances.

Figure 4A:
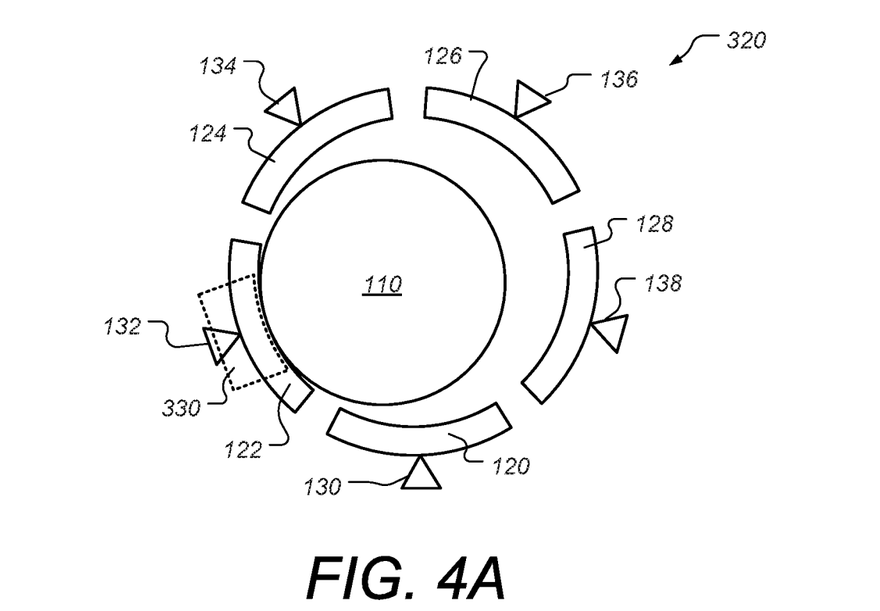
FIGS. 4A and 4B are cross-sectional diagrams illustrating two different magnet locations relative to the tilt-pads, according to some embodiments.
Figure 4B:
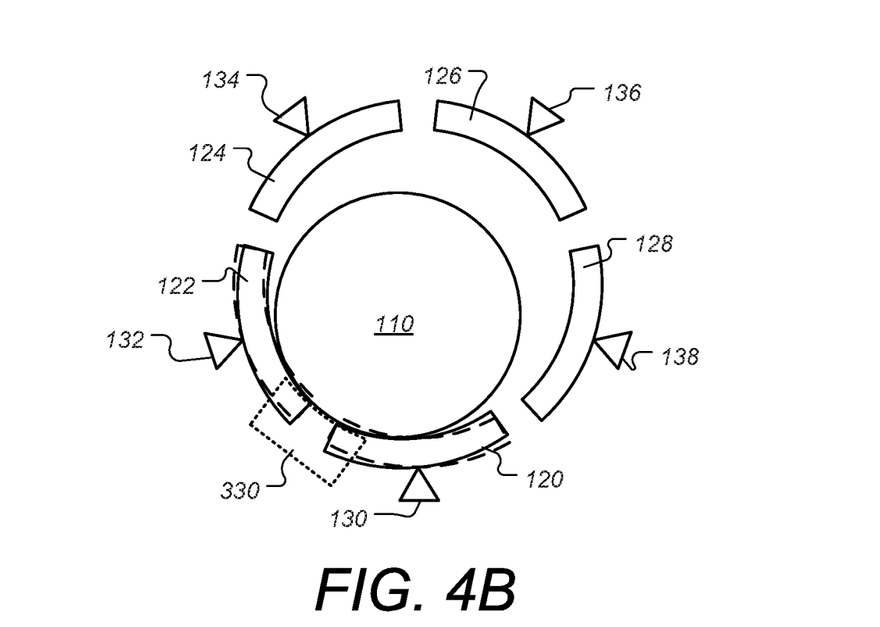

FIGS. 4A and 4B are cross-sectional diagrams illustrating two different magnet locations relative to the tilt-pads, according to some embodiments. Note that although the example in FIGS. 4A and 4B show a set of 5 tilt-pad bearings 120, 122, 124, 126 and 128, other numbers of tilt-pads can be used. Typically, a tilt-pad bearing set contains from three to six pads but other numbers of pads can be used. Orientation of the pads with respect to the magnetic preload can be configured according to the location of the permanent magnet 330. FIG. 4A depicts a "load on pivot" orientation. In this example, permanent magnet 330 is aligned with pivot 132 such that shaft 110 is pulled directed towards the center of tilt pad 122. Note that the curvature of the tilt-pad shoes 120, 122, 124, 126 and 128 exceeds the curvature of shaft 110 which aids in providing a converging gap that forms a minimum oil film between the bearing 120 and shaft 110. For further details on tilt-pad bearing design and configurations, see, e.g. *Tilt Pad Bearing Preload*, Robert C. EisenMann Sr., Sulzer Tech. Rev. (2004).

FIG. 4B depicts a "load between pivots" orientation. In this example, permanent magnet 330 is positioned halfway between pivots 130 and 132 such that shaft 110 is pulled towards the sides of tilt-pads 120 and 122. Note that under the pressure of the magnetically induced preload, the pads 120 and 122 are deflected from their neutral positions (shown in dashed outline). Although a tilt-pad bearing configuration is shown in FIGS. 4A and 4B, other types of bearing can be used with the magnetic force preloading techniques described herein. For example, according to some embodiments, simple fixed geometry bearings can be used instead of the tilt-pad arrangement.

Figure 5:
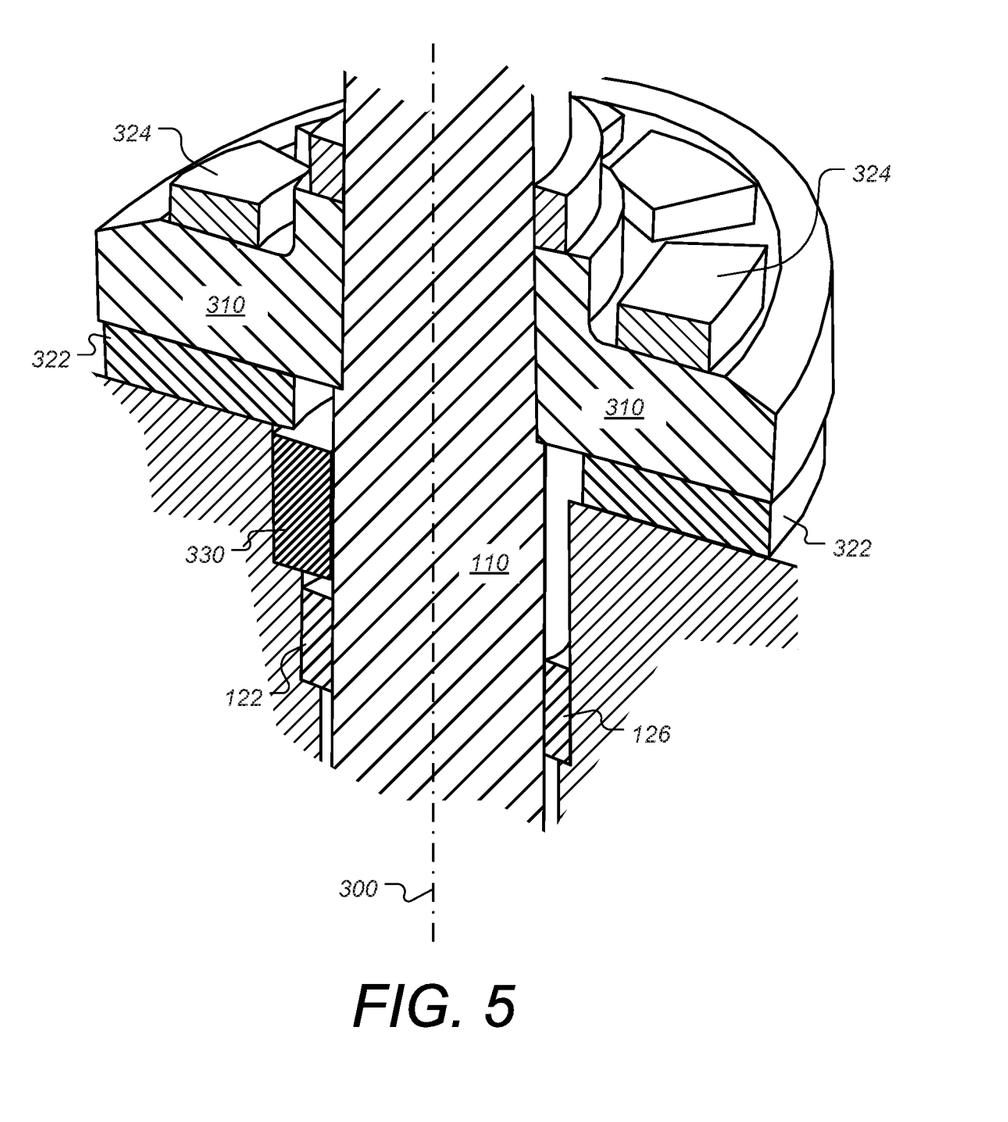
FIG. 5 is a cut-away perspective view illustrating further aspects of a vertically oriented pump having magnetically preloaded shaft bearings, according to some embodiments.

FIG. 5 is a cut-away perspective view illustrating further aspects of a vertically oriented pump having magnetically preloaded shaft bearings, according to some embodiments. Visible in FIG. 5 is the shaft 110 as well as thrust disk 310 and main thrust bearing 322, which are used to handle the downwards force on shaft 110. Reverse thrust bearing pads 324 are also visible. Some of the upper set of journal bearing pads, 122 and 126 are also visible, as is the permanent magnet 330. In the example shown in FIG. 5, the permanent magnet 330 attracts the shaft 110 towards journal bearing pad 122, thereby generating a lateral preload on the vertical shaft 110. This has the benefits of increasing rotor stability, reducing the machine's vulnerability to hydraulically induced imbalance forces and providing smoother transition through critical shaft speeds.

Figure 6:
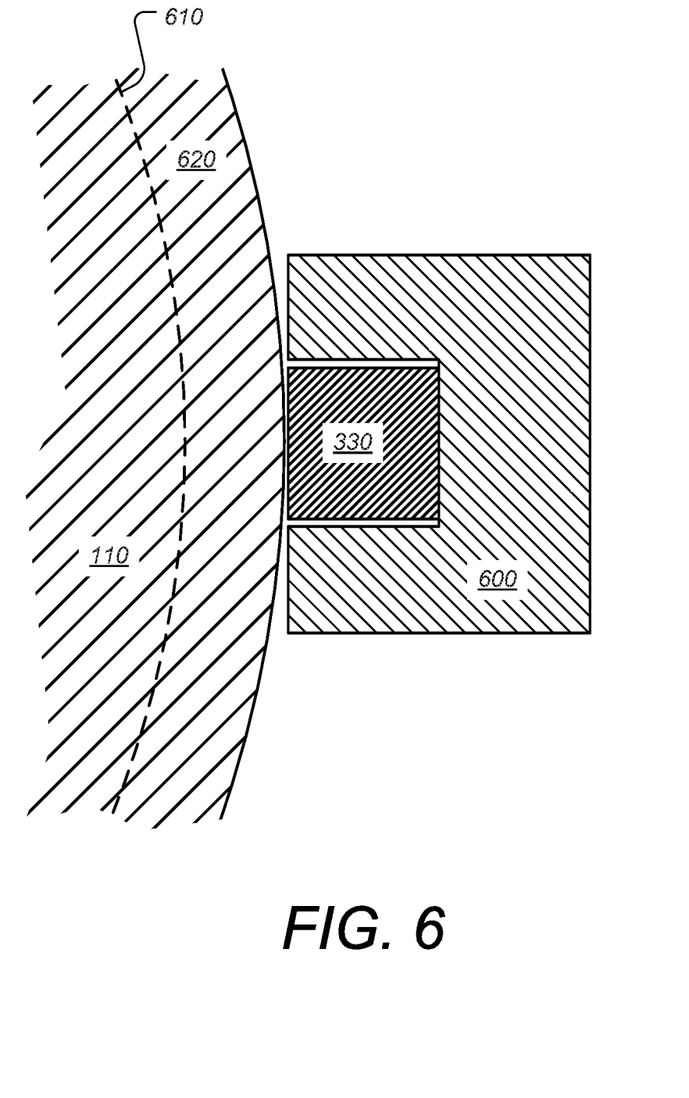
FIG. 6 is a cross-section view of a magnet carrier arrangement used to magnetically preload bearings for a vertically oriented shaft, according to some embodiments.

FIG. 6 is a cross-section view of a magnet carrier arrangement being used to magnetically preload bearings for a vertically oriented shaft, according to some embodiments. In this example, the magnet 330 is housed in a magnetically-conducting open box carrier 600. The box carrier 600 is configured to guide the magnetic field to the shaft 110 from both poles of magnet 330. The box carrier 600 can also function as mounting bracket for the magnet 330, which in some embodiments can be made of a brittle material. According to some embodiments, the shaft 110 may include a sleeve 620 (having an interface marked with dashed line 610) that is made of laminated ferromagnetic steel, as is known for induction motor rotors. By positioning sleeve 620 between the main shaft and the magnet 330, tangential torque and eddy current losses in the shaft can be reduced.

Although some of the embodiments described supra have related to using magnetic preloading of bearings in subsea machinery such as subsea pumps, compressors and separators, according to some embodiments the magnetic preloading techniques can be used in any type of rotating machinery having a vertically oriented shaft and radial journal bearings. For example, in some applications where equipment footprint size is a major factor, such as on a platform, vertically oriented pumps with hydrodynamic bearings may be desirable.

While the subject disclosure is described through the above embodiments, it will be understood by those of ordinary skill in the art that modification to and variation of the illustrated embodiments may be made without departing from the inventive concepts herein disclosed. Moreover, while some embodiments are described in connection with various illustrative structures, one skilled in the art will recognize that the system may be embodied using a variety of specific structures.

What is claimed is:

1. A rotating machine comprising:

a shaft having a primary axis of rotation oriented vertically, the shaft comprising a first journal;

a first bearing surface shaped and positioned to engage the first journal such that a first fluid is pulled between the first bearing surface and the first journal by the rotating of the shaft during machine operation thereby providing lubrication, wherein the first bearing surface is configured to tilt on a fulcrum; and a first magnet configured to impart a lateral force on the shaft thereby pulling the first journal towards the first bearing surface, wherein the first magnet is aligned with the fulcrum and axially offset from the first bearing surface along the primary axis of rotation.

2. The rotating machine of claim 1, wherein the lateral force is static.

3. The rotating machine of claim 1, further comprising a plurality of other bearing surfaces each configured to pivot on a respective fulcrum.

4. The rotating machine of claim 1, wherein the first magnet is a permanent magnet.

5. The rotating machine of claim 1, wherein the first magnet is an electromagnet.

6. The rotating machine of claim 1, comprising a second bearing surface shaped and positioned to engage a second journal on the shaft such that a second fluid is pulled between the second bearing surface and the second journal by rotating of the shaft during operation thereby providing lubrication; and a second magnet configured to impart the lateral force on the shaft thereby pulling the second journal towards the second bearing surface.

7. The rotating machine of claim 1, wherein the rotating machine is configured for deployment in a subsea location.

8. The rotating machine of claim 7, wherein the rotating machine is of a type selected from a group consisting of: a subsea single phase pump, a subsea multiphase pump, a subsea compressor, and a subsea separator.

9. The rotating machine of claim 1, wherein the rotating machine is configured for deployment in a surface location.

10. The rotating machine of claim 1, wherein the first magnet is partially surrounded by a carrier member made of a magnetically conducting material and configured to guide magnetic field from both poles of the first magnet to the shaft.

11. The rotating machine of claim 1, wherein at least a portion of the shaft comprises an outer sleeve made of a ferromagnetic steel configured to reduce tangential torque and eddy current losses in the shaft.

* * * * *